US012533538B2

(12) United States Patent
Lin et al.

(10) Patent No.: US 12,533,538 B2
(45) Date of Patent: Jan. 27, 2026

(54) FIRE PREVENTION AND CONTROL SYSTEM FOR RECHARGEABLE BATTERY CABIN OF SHIP

(71) Applicant: Yantai Chungway New Energy Technology Co., Ltd., Yantai (CN)

(72) Inventors: Hao Lin, Yantai (CN); Lilei Zhang, Yantai (CN); Mingming Li, Yantai (CN); Hualei Wang, Yantai (CN); Yang Wang, Yantai (CN); Xingbin Niu, Yantai (CN); Yuanyuan Tian, Yantai (CN); Haoji Sun, Yantai (CN)

(73) Assignee: Yantai Chungway New Energy Technology Co., Ltd., Yantai (CN)

( * ) Notice: Subject to any disclaimer, the term of this patent is extended or adjusted under 35 U.S.C. 154(b) by 213 days.

(21) Appl. No.: 18/410,641

(22) Filed: Jan. 11, 2024

(65) Prior Publication Data

US 2025/0170438 A1 May 29, 2025

(30) Foreign Application Priority Data

Nov. 23, 2023 (CN) .......................... 202311573135.2

(51) Int. Cl.
*A62C 3/10* (2006.01)
*A62C 35/60* (2006.01)
(Continued)

(52) U.S. Cl.
CPC ................ *A62C 3/10* (2013.01); *A62C 35/60* (2013.01); *A62C 37/38* (2013.01);
(Continued)

(58) Field of Classification Search
CPC ........... A62C 3/10; A62C 35/60; A62C 37/38; H01M 50/204; H01M 50/383; H01M 2220/20
See application file for complete search history.

(56) References Cited

U.S. PATENT DOCUMENTS 12,438,203 B2 * 10/2025 Hao .................. H01M 10/4257
2022/0258647 A1 * 8/2022 Joao ........................ B60L 58/18
(Continued)

FOREIGN PATENT DOCUMENTS

CN 110270032 A 9/2019
CN 111613842 A * 9/2020 ............. B63H 21/17
(Continued)

*Primary Examiner* — Craig Kim

(57) ABSTRACT

Disclosed is a fire prevention and control system for a rechargeable battery cabin of a ship, including a detection apparatus, a fire suppression apparatus, and a control apparatus. The detection apparatus includes a first detection apparatus and a second detection apparatus, the control apparatus includes a first control apparatus and a second control apparatus, the first control apparatus is connected to the first detection apparatus, the second control apparatus is connected to the second detection apparatus, and the first control apparatus and/or the second control apparatus is configured to control whether the fire suppression apparatus releases a fire extinguishing agent. Beneficial effects: This application provides a fire prevention and control system for a rechargeable battery cabin of a ship. Detection apparatuses and control apparatuses are redundantly disposed, to provide high reliability of detection and high reliability of control, and implement a dual-path monitoring-control process of detection apparatus-control apparatus-fire suppression apparatus.

10 Claims, 3 Drawing Sheets

(51) Int. Cl.
*A62C 37/38* (2006.01)
*H01M 50/204* (2021.01)
*H01M 50/383* (2021.01)

(52) U.S. Cl.
CPC ....... *H01M 50/204* (2021.01); *H01M 50/383* (2021.01); *H01M 2220/20* (2013.01)

(56) References Cited

U.S. PATENT DOCUMENTS

| | | | | |
|---|---|---|---|---|
| 2023/0166142 A1* | 6/2023 | Shin | .................. | A62C 3/16 |
| | | | | 169/61 |
| 2023/0216316 A1* | 7/2023 | Li | .................. | H01M 10/441 |
| | | | | 320/124 |
| 2023/0318066 A1* | 10/2023 | Williams | .............. | H01M 10/63 |
| | | | | 429/53 |
| 2024/0024714 A1* | 1/2024 | Lee | .................. | A62C 3/16 |
| 2024/0025297 A1* | 1/2024 | Demont | ................. | B64D 27/24 |

FOREIGN PATENT DOCUMENTS

| | | | | | | |
|---|---|---|---|---|---|---|
| CN | 111803831 A | | 10/2020 | | | |
| CN | 120511940 A | * | 8/2025 | | | |
| JP | 2022551641 A | * | 12/2022 | ......... | H01M 50/383 |
| KR | 20210115085 A | * | 9/2021 | ............. | A62C 37/00 |

\* cited by examiner

FIRE PREVENTION AND CONTROL SYSTEM FOR RECHARGEABLE BATTERY CABIN OF SHIP

CROSS REFERENCE TO RELATED APPLICATIONS

This application claims foreign priority of Chinese Patent Application No. 202311573135.2, filed on Nov. 23, 2023 in the China National Intellectual Property Administration, the disclosures of all of which are hereby incorporated by reference.

TECHNICAL FIELD

The present invention relates to the field of ship firefighting technologies, and specifically to a fire prevention and control system for a rechargeable battery cabin of a ship.

BACKGROUND

In recent years, it has become a global consensus to strengthen environmental protection and reduce emission of polluting gases. Many countries have carried out a series of new emission standards. Energy types dominated by fossil energies gradually turn into low carbon energies. The electric vehicle industry develops most rapidly. As one of the core components of electric vehicles, power batteries have also developed remarkably. The application of power batteries also gradually spreads to other industries from the electric vehicle industry. In the ship field, electric ships powered by lithium-ion batteries have advantages such as green environmentally friendliness, zero pollution, safety, and low use costs, and become popular in the shipping industry.

Similar to an electric vehicle, an electric ship uses a power battery as a power source. However, the ship has high driving power and long endurance. Therefore, a marine power battery system has large total storage energy, and the battery system is complex. A plurality of battery clusters are usually disposed. A plurality of battery packs are disposed in each battery cluster. For example, for some electric ships, nearly 20 battery clusters need to be disposed. 10 to 40 battery packs are disposed in each battery cluster, and a dedicated cabin (rechargeable battery cabin) is disposed for arrangement. When a battery is overheated, overcharged, internally short-circuited, or hit, among other cases, the battery tends to release a large amount of heat and hazardous gases within a short time, and in severe cases, the battery may catch fire. The fire in the battery usually has characteristics such as suddenness, quick spreading, and explosions. Once thermal runaway occurs in one battery pack, thermal runaway may be caused in the power battery system of the entire electric ship, leading to fire. In addition, because the navigational environment of a ship is greatly different from a terrestrial environment, once a ship catches fire in high seas, it is difficult for external forces to attempt rescue. Furthermore, compared with a battery management system of a vehicle, a ship is susceptible to influences of randomness of factors such as weather, hydrology, waterway, and traffic and frequent load fluctuations and large change ranges of the ship, the complexity of a battery management system of the ship is correspondingly increased. Therefore, compared with an electric vehicle, a fire prevention and control system for a rechargeable battery cabin of a ship has a higher requirement of reliability, or even it is required that fire prevention and control can still be performed when the battery management system partially fails or is partially faulty.

Therefore, how to effectively resolve a firefighting safety problem for the storage and use of a large number of lithium batteries on a ship and provide a fire prevention and control system for a rechargeable battery cabin of a ship with high reliability to ensure the safe and reliable operation of an electric ship becomes a current problem that requires urgent research of persons skilled in the art.

SUMMARY

An objective of the present invention is to overcome deficiencies in the prior art and provide a fire prevention and control system for a rechargeable battery cabin of a ship. Detection apparatuses and control apparatuses are redundantly disposed, to provide high reliability of detection and high reliability of control, and implement a dual-path monitoring-control process of detection apparatus-control apparatus-fire suppression apparatus, thereby greatly improving the reliability of the fire prevention and control system.

The objective of the present invention is achieved through the following technology measures: A fire prevention and control system for a rechargeable battery cabin of a ship, where a plurality of battery clusters are disposed in the rechargeable battery cabin, a plurality of battery packs are disposed in each battery cluster, the battery packs are managed by a battery management system, the fire prevention and control system includes a detection apparatus, a fire suppression apparatus, and a control apparatus, the detection apparatus is configured to detect fire information in the battery packs and the rechargeable battery cabin, the detection apparatus includes a first detection apparatus and a second detection apparatus, the control apparatus includes a first control apparatus and a second control apparatus, the first control apparatus is connected to the first detection apparatus, the second control apparatus is connected to the second detection apparatus, and the first control apparatus and/or the second control apparatus is configured to control whether the fire suppression apparatus releases a fire extinguishing agent.

Further, the fire suppression apparatus includes a cluster level suppression apparatus and a cabin level suppression apparatus, one cluster level suppression apparatus is disposed corresponding to one or more battery clusters, the cluster level suppression apparatus is configured to introduce the fire extinguishing agent to the battery packs of the battery cluster, and the cabin level suppression apparatus is configured to introduce the fire extinguishing agent to the rechargeable battery cabin.

Further, the first control apparatus include a remote control host and a first control board connected to the remote control host, the second control apparatus includes a local control host and a second control board connected to the local control host, the first control board and/or the second control board is configured to control whether the fire suppression apparatus releases the fire extinguishing agent, the first control board and the second control board are disposed in the fire suppression apparatus, the local control host is disposed outside the rechargeable battery cabin, and the remote control host is disposed in a cockpit of the ship.

Further, the first detection apparatus includes a first pack level detector and a first cabin level detector, the second detection apparatus includes a second pack level detector and a second cabin level detector, one first pack level detector and one second pack level detector are correspondingly disposed inside each battery pack, and the first cabin level detector and the second cabin level detector are disposed in the battery cabin.

Further, the first pack level detector in each battery cluster is connected to a first control board in a cluster level suppression apparatus corresponding to the battery cluster, and the second pack level detector in each battery cluster is connected to a second control board in a cluster level suppression apparatus corresponding to the battery cluster; and the first cabin level detector is connected to the remote control host, and the second cabin level detector is connected to the local control host.

Further, the remote control host is connected to the local control host, and the first control board is connected to the second control board.

Further, the cluster level suppression apparatus is connected to the plurality of battery packs by a shunting component, and the shunting component is configured to control the fire extinguishing agent to be delivered to a designated battery pack.

Further, the fire suppression apparatus includes a fire extinguishing agent storage tank, an outlet end of the fire extinguishing agent storage tank is connected to a cylinder valve, an outlet of the cylinder valve is connected to a firefighting pipe, the firefighting pipe is configured to deliver the fire extinguishing agent, and the cylinder valve is configured to control whether the fire extinguishing agent storage tank releases the fire extinguishing agent.

Further, a plurality of fire suppression apparatuses are provided, each fire suppression apparatus further includes one reversing valve, the reversing valve is disposed at the firefighting pipe at an outlet end of the cylinder valve of the fire suppression apparatus, and the plurality of reversing valves are connected by a connecting pipe.

Further, the prevention and control system further includes an emergency start/stop switch, the emergency start/stop switch is connected to both the first control apparatus and the second control apparatus, emergency start of the fire suppression apparatus is controlled through the emergency start/stop switch, an overhaul switch is further disposed on the emergency start/stop switch, and when the overhaul knob switch is turned on, the fire prevention and control system enters an overhaul state.

Further, two control circuits are disposed in each of the first control board and the second control board, one is a main control circuit, the other is a spare circuit, and when the main control circuit is faulty, the spare circuit starts working.

Further, each of the remote control host and the local control host is connected to a marine 220-V power supply by a charging adapter, the remote control host supplies power to the first control board, and therefore the local control host supplies power to the second control board.

Further, a spare rechargeable battery is disposed in each of the remote control host, the local control host, the cluster level suppression apparatus, and the cabin level suppression apparatus.

Compared with the prior art, beneficial effects of the present invention are as follows: This application provides a fire prevention and control system for a rechargeable battery cabin of a ship. Detection apparatuses and control apparatuses are redundantly disposed, to provide high reliability of detection and high reliability of control, and implement a dual-path monitoring-control process of detection apparatus-control apparatus-fire suppression apparatus, thereby greatly improving the reliability of the fire prevention and control system. In this application, with a battery cluster as a division unit, the rechargeable battery cabin is divided into regions, and one fire suppression apparatus (cluster level suppression apparatus) is correspondingly disposed in each division region. When a battery pack in a battery cluster encounters thermal runaway and catches fire, a cluster level suppression apparatus corresponding to the battery pack may separately perform fire extinguishing on the battery pack, and the fire suppression apparatus can make a quick response to a fire point. In this application, circuits are redundantly disposed for the first control board and the second control board, thereby further improving the reliability of communication. In this application, the reversing valve and the connecting pipe are disposed. When the fire extinguishing agent in the fire suppression apparatus is insufficient, the fire extinguishing agent may be replenished by changing a circulation direction of the reversing valve and using other fire suppression apparatuses, so that restart of fire in the battery can be effectively suppressed. In this application, the marine 220-V power supply and the spare battery are disposed to implement power supply redundancy for the fire prevention and control system. When the marine 220-V power supply cannot be used, the spare battery may be used to supply power, to ensure that the fire prevention and control system can perform detection, alarm raising, and fire extinguishing.

The present invention is described below in detail with reference to the accompanying drawings and specific implementations.

Where: 1. remote control host, 2. local control host, 3. first cluster level control board, 4. second cluster level control board, 5. first cabin level control board, 6. second cabin level control board, 7. first pack level detector, 8. second pack level detector, 9. cylinder valve, 10. puncture valve, 11. first cabin level detector, 12. second cabin level detector, 13. first emergency start/stop switch, 14. second emergency start/stop switch, 15. fire extinguishing agent storage tank, and 16. reversing valve.

DESCRIPTION OF THE EMBODIMENTS

Figure 1:
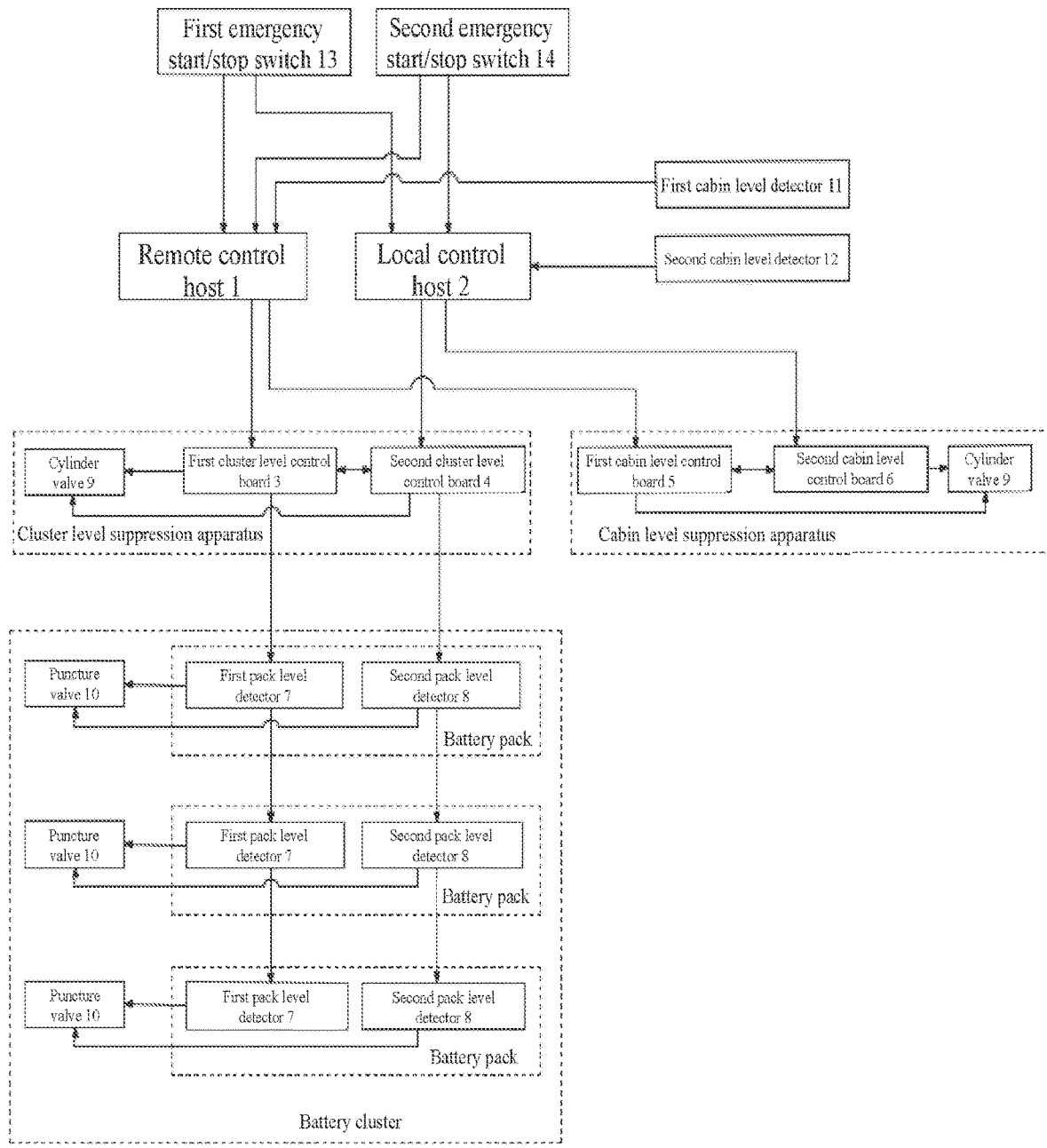
FIG. 1 is a schematic structural diagram of a fire prevention and control system according to the present invention.
Figure 2:
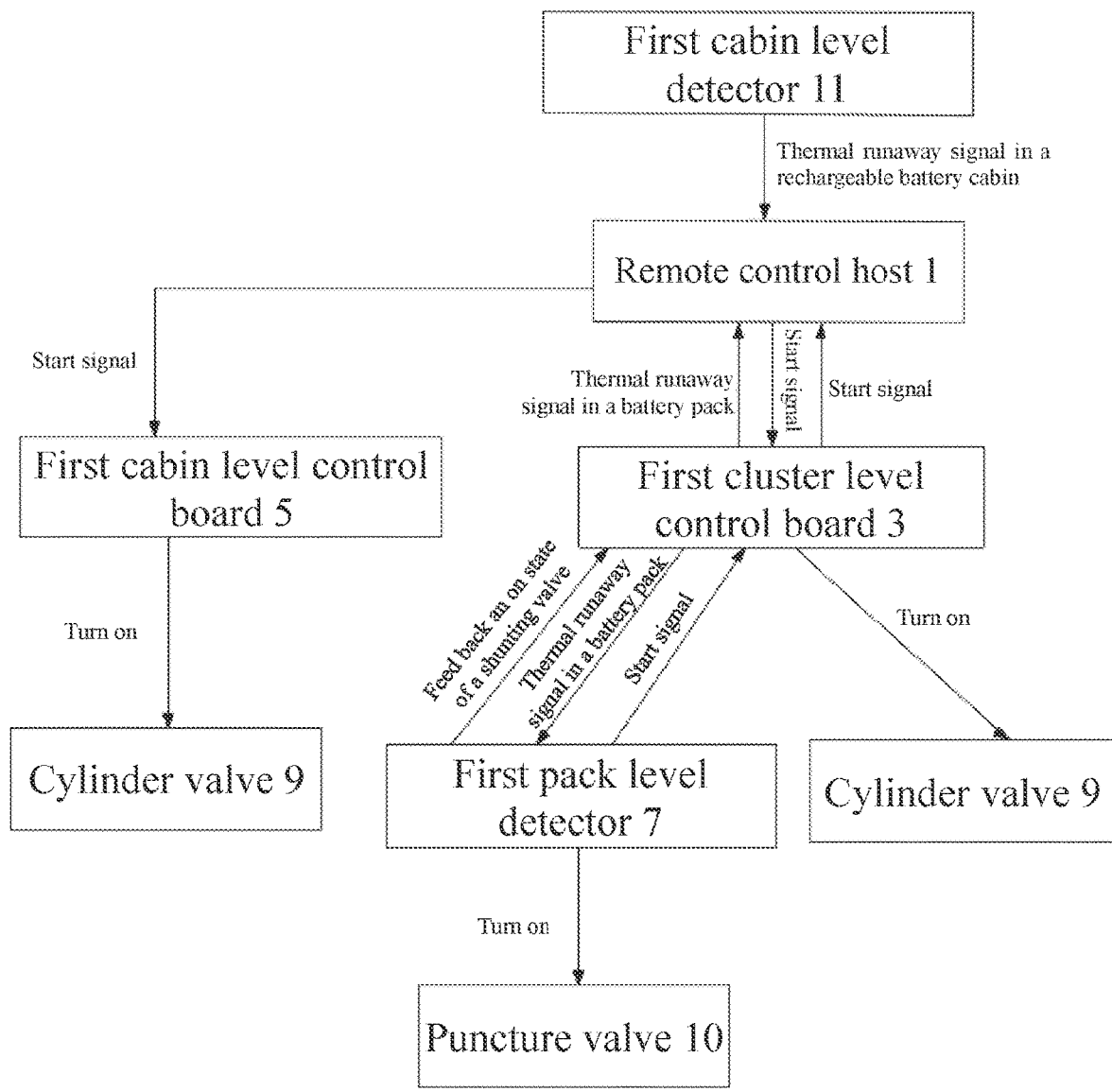
FIG. 2 is a flowchart of one path of monitoring-control process of a fire prevention and control system according to the present invention.
Figure 3:
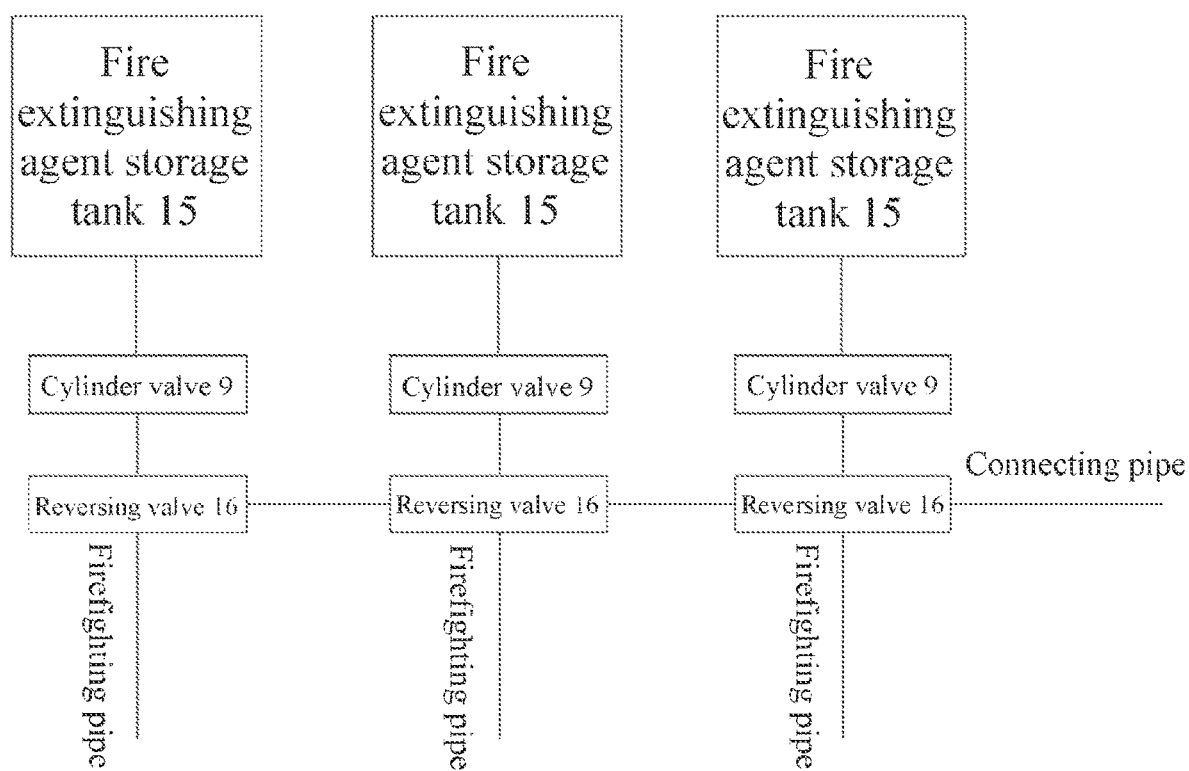
FIG. 3 is a schematic structural diagram of a plurality of fire suppression apparatuses being connected according to the present invention.

As shown in FIG. 1 to FIG. 3, a fire prevention and control system for a rechargeable battery cabin of a ship is provided. A plurality of battery clusters are disposed in the rechargeable battery cabin. A plurality of battery packs are disposed in each battery cluster. The battery packs are managed by a battery management system. The fire prevention and control system is independent of the battery management system. The fire prevention and control system includes a detection apparatus, a fire suppression apparatus, and a control apparatus. Specifically, the detection apparatus is configured to detect fire information in the battery packs and the rechargeable battery cabin. The detection apparatus includes a detection device. The detection device includes one or more of a temperature sensor, a smoke sensor, a CO sensor, a hydrogen sensor, a VOC sensor, a flame sensor, and a $CO_2$ sensor. The detection apparatus may perform composite determination on a parameter signal detected by the detection device and then deliver the parameter signal to the control apparatus. For example, the detection apparatus may categorize fire into four levels including a latent period, a prewarning period, an alarm period, and an open fire period according to parameter ranges to raise an alarm. For the alarm of the second, third, and fourth levels, detected information is uploaded to the control apparatus. The fire suppression apparatus is configured to introduce a fire extinguishing agent into the battery packs or the rechargeable battery cabin to suppress fire. The control apparatus is configured to receive the parameter signal sent by the detection apparatus, perform determination and analysis on the parameter signal, and send an execution command to the fire suppression apparatus. Certainly, the fire prevention and control system may further include an audible and visual alarm apparatus that can send out audible and visual alarm information, and the audible and visual alarm apparatus is controlled by the control apparatus. The detection apparatus includes a first detection apparatus and a second detection apparatus. The first detection apparatus and the second detection apparatus are redundancies of each other. The control apparatus includes a first control apparatus and a second control apparatus. The first control apparatus and the second control apparatus are redundancies of each other. The first control apparatus is connected to the first detection apparatus. The second control apparatus is connected to the second detection apparatus. The first control apparatus and/or the second control apparatus is configured to control whether the fire suppression apparatus releases the fire extinguishing agent. Specifically, the first control apparatus and the second control apparatus may separately perform independent control to start the fire suppression apparatus, or may jointly perform control to start the fire suppression apparatus. In the fire prevention and control system in this application, the detection apparatuses and the control apparatuses are separately redundantly disposed, to implement a dual-path monitoring-control process of detection apparatus-control apparatus-fire suppression apparatus, thereby greatly improving the reliability of the fire prevention and control system. Furthermore, the fire prevention and control system in this application may be integrally disposed with the battery management system, that is, the control apparatus of the battery management system is used as the first control apparatus or the second control apparatus of this application, or may be disposed independently of the battery management system. The fire prevention and control system is disposed independently, to perform independent monitoring and control on fire in the rechargeable battery cabin of the ship without causing any additional interference and control to the operation safety of the ship and a battery power system. Even if battery power of the ship is faulty, the functions of detection, alarm raising, and fire extinguishing are still provided.

The fire suppression apparatus includes a cluster level suppression apparatus and a cabin level suppression apparatus, one cluster level suppression apparatus is disposed corresponding to one or more battery clusters, the cluster level suppression apparatus is configured to introduce the fire extinguishing agent to the battery packs of the battery cluster, and the cabin level suppression apparatus is configured to introduce the fire extinguishing agent to the rechargeable battery cabin. Specifically, in this application, one cluster level suppression apparatus may be disposed corresponding to one battery cluster, or one cluster level suppression apparatus may be disposed corresponding to several battery clusters. For example, one cluster level suppression apparatus is disposed corresponding to two or three battery clusters. The cluster level suppression apparatus is disposed close to the battery cluster corresponding to the cluster level suppression apparatus, so that the fire extinguishing agent in the cluster level suppression apparatus can be delivered in time to a battery pack that catches fire. In this application, with a battery cluster as a division unit, the rechargeable battery cabin is divided into regions, and one fire suppression apparatus (cluster level suppression apparatus) is correspondingly disposed in each division region. When a battery pack in a battery cluster encounters thermal runaway and catches fire, a cluster level suppression apparatus corresponding to the battery pack may separately perform fire extinguishing on the battery pack, and the fire suppression apparatus makes a quick response to a fire point. Compared with a cabin-flooding fire extinguishing manner used in an existing ship, the fire prevention and control system in this application can perform local suppression before fire spreads, to reduce damage to a power battery system of an electric ship. Furthermore, in this application, the cabin level suppression apparatus is further disposed for the rechargeable battery cabin, and the fire extinguishing agent is introduced into the entire rechargeable battery cabin through the cabin level suppression apparatus. If local fire fails to be suppressed and the fire spreads, fire extinguishing can further be performed through the cabin level suppression apparatus.

The first control apparatus includes a remote control host 1 and a first control board connected to the remote control host 1. The second control apparatus includes a local control host 2 and a second control board connected to the local control host 2. The remote control host 1 and the local control host 2 are redundancies of each other. The remote control host 1 and the local control host 2 further have the effect of monitoring and displaying operation states of all the fire suppression apparatuses. The first control board and the second control board are redundancies of each other. The first control board and/or the second control board is configured to control whether the fire suppression apparatus releases the fire extinguishing agent. That is, the first control board and the second control board may separately perform independent control to start the fire suppression apparatus, or may jointly perform control to start the fire suppression apparatus. The first control board and the second control board are disposed in the fire suppression apparatus, the local control host 2 is disposed outside the rechargeable battery cabin, and the remote control host 1 is disposed in a cockpit of the ship. In this application, through remote control of host-first control board-fire suppression apparatus and local control of host-second control board-fire suppression apparatus, redundancy control of the fire suppression apparatus is implemented, thereby improving the reliability of communication for starting the fire suppression apparatus. The local control host 2 may be disposed near a cabin door of the rechargeable battery cabin, for example, disposed on a side of the cabin door of the rechargeable battery cabin. The remote control host 1 is disposed in the cockpit of the ship, and the local control host 2 and the remote control host 1 are distributed at different positions of the ship, making it convenient for a worker to discover fire in time and take measures. Certainly, the fire suppression apparatus in this application includes the cluster level suppression apparatus and the cabin level suppression apparatus. Therefore, to facilitate distinguishing, the first control board and the second control board in the cluster level suppression apparatus in this application are respectively defined as a first cluster level control board 3 and a second cluster level control board 4. The first control board and the second control board in the cabin level suppression apparatus are respectively defined as a first cabin level control board 5 and a second cabin level control board 6. The first cluster level control board 3 and the second cluster level control board 4 are redundancies of each other, and the first cabin level control board 5 and the second cabin level control board 6 are redundancies of each other. One first cluster level control board 3 and one second cluster level control board 4 are correspondingly disposed in each cluster level suppression apparatus. One first cabin level control board 5 and one second cabin level control board 6 are correspondingly disposed in each cabin level suppression apparatus. Specifically, the first cluster level control board 3 may perform CAN communication with the remote control host 1. The second cluster level control board 4 may perform CAN communication with the local control host 2. The first cluster level control board 3 and the second cluster level control board 4 may separately perform independent control to start the cluster level suppression apparatus, or may jointly perform control to start the cluster level suppression apparatus. The first cabin level control board 5 may perform CAN communication with the remote control host 1. The second cabin level control board 6 may perform CAN communication with the local control host 2. The first cabin level control board 5 and the second cabin level control board 6 may separately perform independent control to start the cabin level suppression apparatus, or may jointly perform control to start the cabin level suppression apparatus.

The first detection apparatus includes a first pack level detector 7 and a first cabin level detector 11, the second detection apparatus includes a second pack level detector 8 and a second cabin level detector 12, one first pack level detector 7 and one second pack level detector 8 are correspondingly disposed inside each battery pack, and the first cabin level detector 11 and the second cabin level detector 12 are disposed in the battery cabin. The first pack level detector 7 and the second pack level detector 8 are configured to detect the fire information in the battery packs, and the first cabin level detector 11 and the second cabin level detector 12 are configured to detect the fire information in the rechargeable battery cabin. An early period of thermal runaway of the battery packs is detected through the first pack level detector 7 and the second pack level detector 8, and detection is performed in the early period of thermal runaway and suppression is performed in time, to avoid fire spreading. Moreover, the first pack level detector 7 and the second pack level detector 8 are redundancies of each other, and the first cabin level detector 11 and the second cabin level detector 12 are redundancies of each other. For both the pack level detectors and the cabin level detectors, when one is faulty, the other can still work normally, to provide high reliability of detection.

The first pack level detector 7 in each battery cluster is connected to a first control board in a cluster level suppression apparatus corresponding to the battery cluster, and the second pack level detector 8 in each battery cluster is connected to a second control board in a cluster level suppression apparatus corresponding to the battery cluster; and the first cabin level detector 11 is connected to the remote control host 1, and the second cabin level detector 12 is connected to the local control host 2. Specifically, the first pack level detector 7 may perform CAN communication or wireless communication with the first cluster level control board 3, and the second pack level detector 8 may perform CAN communication or wireless communication with the second cluster level control board 4. When a CAN communication manner is used between the first pack level detector 7 and the first cluster level control board 3 and between the second pack level detector 8 and the second cluster level control board 4, a plurality of first pack level detectors 7 in each battery cluster may be connected in parallel. One of the plurality of first pack level detectors 7 is connected to the first cluster level control board 3. A plurality of second pack level detectors 8 in each battery cluster may be connected in parallel, and one of the plurality of second pack level detectors 8 is connected to the second cluster level control board 4. The first cabin level detector 11 may perform CAN communication or wireless communication with the remote control host 1, and the second cabin level detector 12 may perform CAN communication or wireless communication with the local control host 2. Each cluster level suppression apparatus only receives fire information in a battery cluster corresponding to the cluster level suppression apparatus, and a plurality of cluster level suppression apparatuses do not interfere with each other. The remote control host 1 and the local control host 2 only need to receive fire information fed back by all the cluster level suppression apparatuses and detected information of the first cabin level detector 11 and the second cabin level detector 12, and the remote control host 1 and the local control host 2 do not need to directly receive all the fire information in the battery packs.

The remote control host 1 is connected to the local control host 2, and the first control board is connected to the second control board. Specifically, the remote control host 1 and the local control host 2 may synchronize data in real time through RS485 communication. The first control board and the second control board may exchange information in an internal serial port manner. Through information exchange between the remote control host 1 and the local control host 2 and between the first control board and the second control board, in this application, on the basis of implementing communication of two paths of detected information of battery packs of first pack level detector-first cluster level control board-remote control host and second pack level detector-second cluster level control board-local control host, communication lines of two types of detected information of first pack level detector-first cluster level control board-second cluster level control board-local control host and second pack level detector-second cluster level control board-first cluster level control board-remote control host can be further implemented, thereby improving the communication reliability of the detected information.

The cluster level suppression apparatus is connected to the plurality of battery packs by a shunting component, and the shunting component is configured to control the fire extinguishing agent to be delivered to a designated battery pack. Specifically, the shunting component may be a shunting valve having a shunting effect, or a valve assembly formed by a plurality of valves. If the shunting component is a shunting valve, a multi-way shunting valve may be used, that is, a shunting valve having a plurality of outlet ends and can independently control opening or closing of the plurality of outlet ends. The outlet ends of the shunting valve are respectively in communication with the battery packs through firefighting pipes. The fire extinguishing agent flowing out of the cluster level suppression apparatus may flow through an inlet end of the shunting valve to enter the shunting valve and enter a designated battery pack through an outlet end of the shunting valve. The shunting valve may be electrically connected to the control apparatus, or may be electrically connected to the detection apparatus. When the shunting valve is electrically connected to the detection apparatus, the shunting valve may be electrically connected to both the first pack level detector 7 and the second pack level detector 8. If the shunting component is a valve assembly, the valve assembly may be a valve that can control on or off of a fluid, for example, a puncture valve 10, a ball valve, or a solenoid valve. When the valve assembly is the puncture valve 10, one puncture valve 10 is disposed corresponding to each battery pack. A liquid inlet channel, a liquid outlet channel, and a mounting channel are disposed in the puncture valve 10. A film is used for sealing between the liquid inlet channel and the liquid outlet channel. The liquid outlet channel is in communication with the battery packs. A puncture mechanism is mounted in the mounting channel. The puncture mechanism is configured to puncture the film. The puncture mechanism may be electrically connected to the control apparatus, or may be electrically connected to the detection apparatus. When the puncture mechanism is electrically connected to the detection apparatus, the puncture mechanism may be electrically connected to both the first pack level detector 7 and the second pack level detector 8. When a battery pack catches fire, the puncture mechanism punctures the film, the liquid inlet channel is in communication with the liquid outlet channel, and the fire extinguishing agent of the cluster level suppression apparatus may flow through liquid inlet channel-liquid outlet channel to enter the battery packs. When the valve assembly is a ball valve or a solenoid valve, one ball valve or solenoid valve is disposed corresponding to each battery pack. The fire extinguishing agent of the cluster level suppression apparatus may flow into an inlet end of the ball valve or the solenoid valve and flow into a battery pack through an outlet end of the ball valve or the solenoid valve. It is only necessary to control the ball valve or the solenoid valve to be opened to implement that the fire extinguishing agent flows into a designated battery pack. The ball valve or the solenoid valve may be electrically connected to the control apparatus, or may be electrically connected to the detection apparatus. When the ball valve or the solenoid valve is electrically connected to the detection apparatus, the ball valve or the solenoid valve may be electrically connected to both the first pack level detector 7 and the second pack level detector 8.

The fire suppression apparatus includes a fire extinguishing agent storage tank 15, an outlet end of the fire extinguishing agent storage tank 15 is connected to a cylinder valve 9, an outlet of the cylinder valve 9 is connected to a firefighting pipe, the firefighting pipe is configured to deliver the fire extinguishing agent, and the cylinder valve 9 controls whether the fire extinguishing agent storage tank 15 releases the fire extinguishing agent. Specifically, the fire extinguishing agent is stored in the fire extinguishing agent storage tank 15, and the fire extinguishing agent storage tank 15 may be a stored-pressure storage tank. The opening and closing of the cylinder valve 9 may be controlled by the control apparatus. Certainly, the fire suppression apparatus in this application may be the cluster level suppression apparatus or may be the cabin level suppression apparatus. When the fire suppression apparatus is the cluster level suppression apparatus, the firefighting pipe is configured to deliver the fire extinguishing agent into a battery packs, and the cylinder valve 9 may be electrically connected to both the first cluster level control board 3 and the second cluster level control board 4. When the fire suppression apparatus is the cabin level suppression apparatus, the firefighting pipe is configured to deliver the fire extinguishing agent into the rechargeable battery cabin, and the cylinder valve 9 may be electrically connected to both the first cabin level control board 5 and the second cabin level control board 6.

A plurality of fire suppression apparatuses are provided. Each fire suppression apparatus further includes one reversing valve 16. The reversing valve 16 is configured to change a delivery direction of the fire extinguishing agent. The reversing valve 16 is disposed at the firefighting pipe at an outlet end of the cylinder valve 9 of the fire suppression apparatus. The plurality of reversing valves 16 are connected by a connecting pipe. Specifically, the reversing valve 16 at least includes one liquid inlet end, one liquid outlet end, and one connecting end. The liquid inlet end is connected to the outlet end of the cylinder valve 9. The connecting end is connected to the connecting pipe. The liquid outlet end is connected to the firefighting pipe. The fire extinguishing agent that flows out of the outlet end of the cylinder valve 9 may flow through liquid inlet end-liquid outlet end to enter the firefighting pipe, or may flow through liquid inlet end-connecting end to enter the connecting pipe. The fire extinguishing agent in the connecting pipe may flow through connecting end-liquid outlet end to enter the firefighting pipe. When the fire suppression apparatus performs fire extinguishing, if the fire extinguishing agent in the fire suppression apparatus is insufficient, the fire extinguishing agent may flow through the connecting pipe and connecting end-liquid outlet end to enter the firefighting pipe by changing a circulation direction of the reversing valve 16 and opening cylinder valves 9 of other fire suppression apparatuses, thereby ensuring the supply of the fire extinguishing agent. The reversing valve 16 may be controlled by the control apparatus. Certainly, in this application, the fire suppression apparatus may be the cluster level suppression apparatus, or may be the cabin level suppression apparatus. When the fire suppression apparatus is the cluster level suppression apparatus, the reversing valve 16 of the cluster level suppression apparatus is controlled by the first cluster level control board 3 and/or the second cluster level control board 4. When the fire suppression apparatus is the cabin level suppression apparatus, the reversing valve 16 of the cabin level suppression apparatus is controlled by the first cabin level control board 5 and/or the second cabin level control board 6.

The prevention and control system further includes an emergency start/stop switch, the emergency start/stop switch is connected to both the first control apparatus and the second control apparatus, emergency start of the fire suppression apparatus is controlled through the emergency start/stop switch, an overhaul knob switch is further disposed on the emergency start/stop switch, and when the overhaul knob switch is turned on, the fire prevention and control system enters an overhaul state. Specifically, two emergency start/stop switches, that is, a first emergency start/stop switch 13 and a second emergency start/stop switch 14, may be disposed. The first emergency start/stop switch 13 is disposed in the cockpit of the ship, and the second emergency start/stop switch 14 is disposed outside the rechargeable battery cabin. The first emergency start/stop switch 13 and the second emergency start/stop switch 14 are connected to both the first control apparatus and the second control apparatus. Further, the first emergency start/stop switch 13 and the second emergency start/stop switch 14 are connected to both the remote control host 1 and the local control host 2. The emergency start/stop switch includes a control board, and an emergency start/stop button and the overhaul knob switch are disposed on the control board. When the emergency start/stop button is pressed, the prevention and control system is turned on or stopped emergently. When the overhaul knob switch is turned on, the prevention and control system enters the overhaul state. The overhaul state includes that the first control apparatus and the second control apparatus enter a faulty detection state, that is, the local control host 2, the remote control host 1, the first cluster level control board 3, the second cluster level control board 4, the first cabin level control board 5, and the second cabin level control board 6 enter a faulty overhaul state. The overhaul state further includes online faulty detection of the detection apparatus, that is, the alarm sensitivity of the first cabin level detector 11 and the second cabin level detector 12 is detected by manually changing a concentration of a gas around the first cabin level detector 11 and the second cabin level detector 12. In the overhaul state, the fire suppression apparatus is not started.

Two control circuits are disposed in each of the first control board and the second control board, one is a main control circuit, the other is a spare circuit, and when the main control circuit is faulty, the spare circuit starts working. Specifically, the main control circuit and the spare circuit are same circuits having same logic. Switching is performed through circuit control. When the main control circuit works, the spare circuit does not work. When the main control circuit is faulty, switching is automatically performed to the spare circuit for normal working.

Each of the remote control host 1 and the local control host 2 is connected to a marine 220-V power supply by a charging adapter, the remote control host 1 supplies power to the first control board, and the local control host 2 supplies power to the second control board. Specifically, the charging adapter converts marine AC 220 V into DC 24 V. The remote control host 1 supplies power to the first cluster level control board 3 and the first cabin level control board 5, and the local control host 2 supplies power to the second cluster level control board 4 and the second cabin level control board 6. Furthermore, the remote control host 1 and the local control host 2 further supply power to the first emergency start/stop switch 13 and the second emergency start/stop switch 14 and the first cabin level detector 11 and the second cabin level detector 12. The first cluster level control board 3 supplies power to the first pack level detector 7, and the second cluster level control board 4 supplies power to the second pack level detector 8.

A spare rechargeable battery is disposed in each of the remote control host 1, the local control host 2, the cluster level suppression apparatus, and the cabin level suppression apparatus. Specifically, the spare power source is a DC 24-V power source. When a marine 220-V power supply is faulty, the spare power source supplies power to the remote control host 1, the local control host 2, the first cluster level control board 3, the second cluster level control board 4, the first cabin level control board 5, and the second cabin level control board 6.

As shown in FIG. 1 and FIG. 2, when the fire prevention and control system is in a normal working state, if thermal runaway occurs in a battery pack, in this application, prevention and control may be performed through a two-path monitoring-control process of first pack level detector-first cluster level control board-remote control host and second pack level detector-second cluster level control board-local control host. Similarly, when fire occurs in the rechargeable battery cabin, prevention and control may also be performed through two paths. One path is used as an example for detailed description below. When thermal runaway occurs in the battery packs, the first pack level detector 7 detects thermal runaway information and uploads the thermal runaway information to the first cluster level control board 3. The first cluster level control board 3 uploads the thermal runaway information to the remote control host 1, and the remote control host 1 delivers a start signal according to the thermal runaway information. The first cluster level control board 3 receives the start signal and delivers the start signal to the first pack level detector 7. The first pack level detector 7 electrically opens the puncture valve 10 after receiving the start signal, and simultaneously, feeds back an open state of the puncture valve 10 to the first cluster level control board 3. The first cluster level control board 3 opens the cylinder valve 9 after receiving the open state of the puncture valve 10, and introduces the fire extinguishing agent into a battery pack. Moreover, the first cluster level control board 3 feeds back a start state of the fire extinguishing agent to the remote control host 1. When fire occurs in the rechargeable battery cabin, the first cabin level detector 11 detects fire information and uploads the fire information to the remote control host 1. The remote control host 1 delivers the start signal after receiving the fire information. The first cabin level control board 5 opens the cylinder valve 9 after receiving the start signal, and introduces the fire extinguishing agent into the rechargeable battery cabin to perform fire suppression.

In the description of the present invention, it needs to be noted that unless otherwise expressly specified and defined, "mounted", "connected", and "connection" should be understood in a broad sense, for example, fixedly connected, detachably connected, or integrally connected; or mechanically connected, or communicatively connected, electrically connected; or connected directly or through an intermediate, or two elements communicated internally, or connected wirelessly, or connected in a wired manner. A person of ordinary skill in the art may understand specific meanings of the foregoing terms in the present invention to specific cases.

In the description of the present invention, it needs to be noted that orientation or location relationships indicated by terms "center", "up", "down", "left", "right", "vertical", and "horizontal", are based on orientation or location relationships shown in the accompanying drawings, and are only used to facilitate description of the present invention and simplify description, but are not used to indicate or imply that the apparatuses or elements must have specific orientations or are constructed and operated by using specific orientations, and therefore, cannot be understood as a limitation to the present invention. In addition, the terms "first", "second", and "third" are used only for description, but are not intended to indicate or imply relative importance.

In the description of the present invention, the term "and/or" in this specification describes only an association relationship for describing associated objects and represents that three relationships may exist. For example, A and/or B may represent the following three cases: Only A exists, both A and B exist, and only B exists. In addition, the character "/" herein generally indicates an "or" relationship between the contextual objects.

A person skilled in the art should understand that the present invention is not limited by the above embodiments, and what is described in the above embodiments and the specification is only to describe the principle of the present invention. Without departing from the spirit and scope of the present invention, various changes and improvements may be made to the present invention. All these changes and improvements fall within the scope that the present invention seeks to protect. The scope of protection of the present invention is defined by the appended claims and their equivalents.

What is claimed is:

1. A fire prevention and control system for a rechargeable battery cabin of a ship, wherein a plurality of battery clusters are disposed in the rechargeable battery cabin, a plurality of battery packs are disposed in each battery cluster, the battery packs are managed by a battery management system, the fire prevention and control system comprises a detection apparatus, a fire suppression apparatus, and a control apparatus, the detection apparatus is configured to detect fire information in the battery packs and the rechargeable battery cabin, the detection apparatus comprises a first detection apparatus and a second detection apparatus, the control apparatus comprises a first control apparatus and a second control apparatus, the first control apparatus is connected to the first detection apparatus, the second control apparatus is connected to the second detection apparatus, and the first control apparatus and/or the second control apparatus is configured to control whether the fire suppression apparatus releases a fire extinguishing agent, the fire suppression apparatus comprises a cluster level suppression apparatus and a cabin level suppression apparatus, one cluster level suppression apparatus is disposed corresponding to one or more battery clusters, the cluster level suppression apparatus is configured to introduce the fire extinguishing agent to the battery packs of the battery cluster, and the cabin level suppression apparatus is configured to introduce the fire extinguishing agent to the rechargeable battery cabin, the first control apparatus comprise a remote control host and a first control board connected to the remote control host, the second control apparatus comprises a local control host and a second control board connected to the local control host, the first control board and/or the second control board is configured to control whether the fire suppression apparatus releases the fire extinguishing agent, the first control board and the second control board are disposed in the fire suppression apparatus, the local control host is disposed outside the rechargeable battery cabin, and the remote control host is disposed in a cockpit of the ship, the first detection apparatus comprises a first pack level detector and a first cabin level detector, the second detection apparatus comprises a second pack level detector and a second cabin level detector, one first pack level detector and one second pack level detector are correspondingly disposed inside each battery pack, and the first cabin level detector and the second cabin level detector are disposed in the battery cabin.

2. The fire prevention and control system for a rechargeable battery cabin of a ship according to claim 1, wherein the first pack level detector in each battery cluster is connected to a first control board in a cluster level suppression apparatus corresponding to the battery cluster, and the second pack level detector in each battery cluster is connected to a second control board in a cluster level suppression apparatus corresponding to the battery cluster; and the first cabin level detector is connected to the remote control host, and the second cabin level detector is connected to the local control host.

3. The fire prevention and control system for a rechargeable battery cabin of a ship according to claim 2, wherein the remote control host is connected to the local control host, and the first control board is connected to the second control board.

4. The fire prevention and control system for a rechargeable battery cabin of a ship according to claim 1, wherein the cluster level suppression apparatus is connected to the plurality of battery packs by a shunting component, and the shunting component is configured to control the fire extinguishing agent to be delivered to a designated battery pack.

5. The fire prevention and control system for a rechargeable battery cabin of a ship according to claim 1, wherein the fire suppression apparatus comprises a fire extinguishing agent storage tank, an outlet end of the fire extinguishing agent storage tank is connected to a cylinder valve, an outlet of the cylinder valve is connected to a firefighting pipe, the firefighting pipe is configured to deliver the fire extinguishing agent, and the cylinder valve is configured to control whether the fire extinguishing agent storage tank releases the fire extinguishing agent.

6. The fire prevention and control system for a rechargeable battery cabin of a ship according to claim 5, wherein a plurality of fire suppression apparatuses are provided, each fire suppression apparatus further comprises one reversing valve, the reversing valve is disposed at the firefighting pipe at an outlet end of the cylinder valve of the fire suppression apparatus, and the plurality of reversing valves are connected by a connecting pipe.

7. The fire prevention and control system for a rechargeable battery cabin of a ship according to claim 1, wherein the prevention and control system further comprises an emergency start/stop switch, the emergency start/stop switch is connected to both the first control apparatus and the second control apparatus, emergency start of the fire suppression apparatus is controlled through the emergency start/stop switch, an overhaul knob switch is further disposed on the emergency start/stop switch, and when the overhaul knob switch is turned on, the fire prevention and control system enters an overhaul state.

8. Fire prevention and control system for a rechargeable battery cabin of a ship, wherein a plurality of battery clusters are disposed in the rechargeable battery cabin, a plurality of battery packs are disposed in each battery cluster, the battery packs are managed by a battery management system, the fire prevention and control system comprises a detection apparatus, a fire suppression apparatus, and a control apparatus, the detection apparatus is configured to detect fire information in the battery packs and the rechargeable battery cabin, the detection apparatus comprises a first detection apparatus and a second detection apparatus, the control apparatus comprises a first control apparatus and a second control apparatus, the first control apparatus is connected to the first detection apparatus, the second control apparatus is connected to the second detection apparatus, and the first control apparatus and/or the second control apparatus is configured to control whether the fire suppression apparatus releases a fire extinguishing agent, the fire suppression apparatus comprises a cluster level suppression apparatus and a cabin level suppression apparatus, one cluster level suppression apparatus is disposed corresponding to one or more battery clusters, the cluster level suppression apparatus is configured to introduce the fire extinguishing agent to the battery packs of the battery cluster, and the cabin level suppression apparatus is configured to introduce the fire extinguishing agent to the rechargeable battery cabin, the first control apparatus comprise a remote control host and a first control board connected to the remote control host, the second control apparatus comprises a local control host and a second control board connected to the local control host, the first control board and/or the second control board is configured to control whether the fire suppression apparatus releases the fire extinguishing agent, the first control board and the second control board are disposed in the fire suppression apparatus, the local control host is disposed outside the rechargeable battery cabin, and the remote control host is disposed in a cockpit of the ship, two control circuits are disposed in each of the first control board and the second control board, one is a main control circuit, the other is a spare circuit, and when the main control circuit is faulty, the spare circuit starts working.

9. A fire prevention and control system for a rechargeable battery cabin of a ship, wherein a plurality of battery clusters are disposed in the rechargeable battery cabin, a plurality of battery packs are disposed in each battery cluster, the battery packs are managed by a battery management system, the fire prevention and control system comprises a detection apparatus, a fire suppression apparatus, and a control apparatus, the detection apparatus is configured to detect fire information in the battery packs and the rechargeable battery cabin, the detection apparatus comprises a first detection apparatus and a second detection apparatus, the control apparatus comprises a first control apparatus and a second control apparatus, the first control apparatus is connected to the first detection apparatus, the second control apparatus is connected to the second detection apparatus, and the first control apparatus and/or the second control apparatus is configured to control whether the fire suppression apparatus releases a fire extinguishing agent, the fire suppression apparatus comprises a cluster level suppression apparatus and a cabin level suppression apparatus, one cluster level suppression apparatus is disposed corresponding to one or more battery clusters, the cluster level suppression apparatus is configured to introduce the fire extinguishing agent to the battery packs of the battery cluster, and the cabin level suppression apparatus is configured to introduce the fire extinguishing agent to the rechargeable battery cabin, the first control apparatus comprise a remote control host and a first control board connected to the remote control host, the second control apparatus comprises a local control host and a second control board connected to the local control host, the first control board and/or the second control board is configured to control whether the fire suppression apparatus releases the fire extinguishing agent, the first control board and the second control board are disposed in the fire suppression apparatus, the local control host is disposed outside the rechargeable battery cabin, and the remote control host is disposed in a cockpit of the ship, each of the remote control host and the local control host is connected to a marine 220-V power supply by a charging adapter, the remote control host supplies power to the first control board, and therefore the local control host supplies power to the second control board.

10. The fire prevention and control system for a rechargeable battery cabin of a ship according to claim 9, wherein a spare rechargeable battery is disposed in each of the remote control host, the local control host, the cluster level suppression apparatus, and the cabin level suppression apparatus.

\* \* \* \* \*